United States Patent [19]

Sakai

[11] Patent Number: 5,053,894
[45] Date of Patent: Oct. 1, 1991

[54] MAGNETIC RECORDING AND REPRODUCING APPARATUS

[75] Inventor: Kouichi Sakai, Suita, Japan

[73] Assignee: Matsushita Electric Industrial Co., Ltd., Osaka, Japan

[21] Appl. No.: 383,532

[22] Filed: Jul. 21, 1989

[30] Foreign Application Priority Data

Jul. 22, 1988 [JP] Japan ............................. 63-184359

[51] Int. Cl.⁵ ...................... G11B 13/18; G11B 15/68
[52] U.S. Cl. ........................................ 360/69; 360/92
[58] Field of Search .................. 360/69, 71, 75, 77.12, 360/92

[56] References Cited

U.S. PATENT DOCUMENTS

| | | | |
|---|---|---|---|
| 3,898,692 | 8/1975 | Teruuchi | 360/69 |
| 4,604,661 | 8/1986 | De Shon | 360/69 |
| 4,745,495 | 5/1988 | Hashimoto | 360/69 X |
| 4,835,630 | 5/1989 | Freer | 360/69 |

Primary Examiner—A. J. Heinz
Attorney, Agent, or Firm—Wenderoth, Lind & Ponack

[57] ABSTRACT

A magnetic recording and reproducing apparatus, such as a compact cassette tape recorder, a digital audio cassette tape recorder and the like, has two sets of mechanisms and includes a pair of detect switches for detecting the presence of tape cassettes mounted on the respective mechanisms, a set of operation switches for operating the mechanisms, and a controller for controlling the operation of the mechanisms to automatically select the one mechanism onto which a tape cassette has been mounted subsequent to a cassette having been mounted on the other mechanism, and to operae the one selected mechanism.

2 Claims, 6 Drawing Sheets

MAGNETIC RECORDING AND REPRODUCING APPARATUS

BACKGROUND OF THE INVENTION

The present invention generally relates to magnetic recording and reproducing, and more particularly, to a magnetic recording and reproducing apparatus loading with two sets of mechanisms such as a compact cassette tape recorder, a digital audio cassette tape recorder, and the like.

Figure 5:
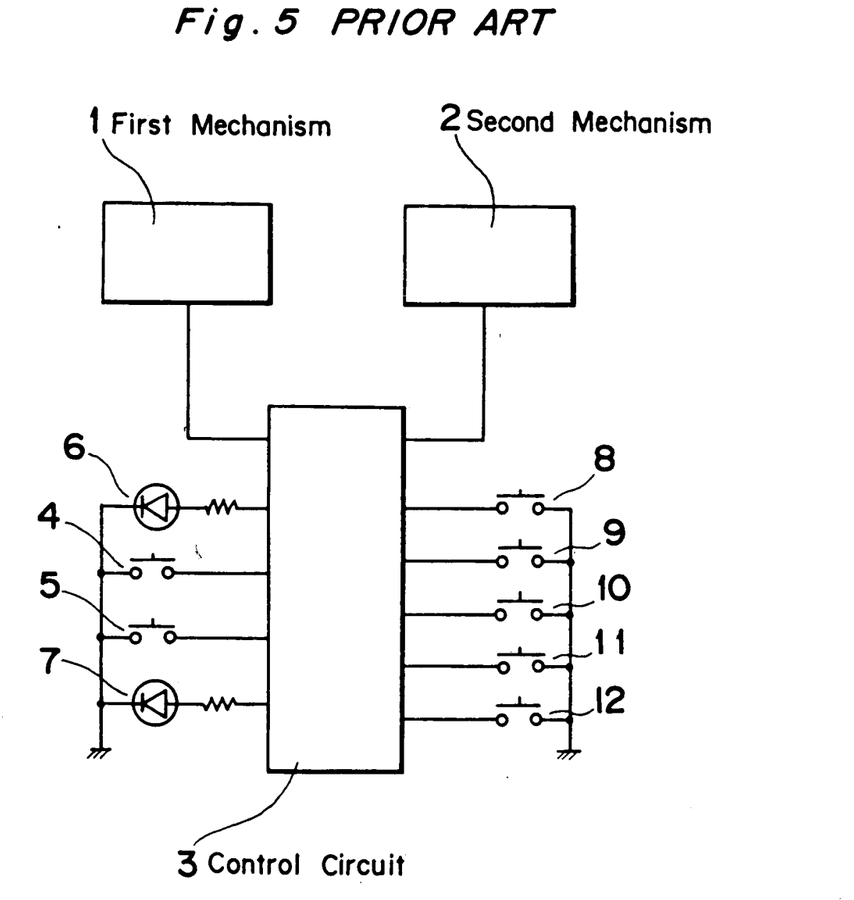
FIG. 5 is a block diagram showing a conventional magnetic recording and reproducing apparatus as already referred to above.

Recently, in sites for recording and reproducing music and the like, there have been widely adopted recording and reproducing control systems which employ two sets of mechanisms, as shown in FIG. 5. FIG. 5 is a block diagram of electric circuit showing a conventional magnetic recording and reproducing apparatus which comprises a first mechanism 1, a second mechanism 2, a control circuit 3 including a micro-computer, a gate circuit and other elements for controlling the operation of the mechanisms 1 and 2, a pair of selection switches 4 and 5 for operating either one of the mechanisms, respectively, a first display means 6 including a light emitting diode and the like for indicating the selection of operation of the first mechanism by means of the selection switch 4, a second display means 7 for indicating the selection of operation of the second mechanism by means of the selection switch 5, and a set of operation switches 8 to 12 for the mechanisms to provide the operations of recording, fast forwarding, rewinding, reproducing, stopping, etc. For the systems as referred to above, in the case of mounting a tape cassette on only the first mechanism 1, the first mechanism 1 can be operated by the operations of operation switches 8 to 12 upon turning on the first display means 6, and it is necessary to operate the selection switch 5 in advance for mounting a tape cassette onto the second mechanism 2. Accordingly, with the conventional systems it needs a troublesome operation for changing from one mechanism to the other mechanism in such a manner that, in order to mount and operate immediately a tape cassette onto the other of the two mechanisms after making the selection of the one of mechanisms, the selection switch must first be operated to change from the one mechanism to the other mechanism, and then the operation switches must be operated to operate the other mechanism Also, as another example of conventional systems as referred to above, there has been proposed an apparatus subjected to the operation of what is called timer starting, wherein the first mechanism is provided only with a reproducing function, while the second mechanism is provided with the two functions of recording and reproducing, and the second mechanism is automatically operated to record or reproduce when electrical power is provided to the second mechanism. With this system, it is not enough for the systems including a set of mechanisms to operate effectively with respect to the operation of timer starting, for instance, in the case of employing the system for reproducing of tape in place of an alarm clock every morning it often occurs if a tape cassette is not mounted on the second mechanism by any means.

SUMMARY OF THE INVENTION

Accordingly, an essential object of the present invention is to provide a magnetic recording and reproducing apparatus which can eliminate the disadvantages inherent to the conventional apparatus of this kind, and wherein there provides an arrangement for detecting the mounting of tape cassettes onto two sets of mechanisms to change automatically the selection of mechanisms to the one onto which a tape cassette is mounted subsequent to the other mechanism, so as to thereby improve the efficiency of operation for the apparatus.

Another object of the present invention is to provide a magnetic recording and reproducing apparatus which is provided with a pair of detect switches for detecting the presence of tape cassettes mounted on the mechanisms so that, when a tape cassette is mounted on only one mechanism having a function of reproducing, the one mechanism is adapted to operate the reproducing of a timer function in order to prevent the losing of the timer function.

In accomplishing these and other objects, according to one preferred embodiment of the present invention, there is provided a magnetic recording and reproducing apparatus which comprises two set of mechanisms in association with one set of operation switches, a pair of detect switches for detecting the presence of tape cassettes of the mechanisms, and a control means for operating in a desired operation the selected one of the mechanisms and for changing automatically to the selection of the one mechanism onto which a tape cassette has been mounted subsequent to a cassette having been mounted on the other mechanism. By the arrangement according to the present invention as described above, since the control means is operated to place in an operating state of operating the one mechanism onto which a tape cassette has been mounted subsequent to a cassette having been mounted on the other mechanism, the one selected mechanism can be immediately operated by pressing any one of the operation switches without trouble.

In accordance with another preferred embodiment of the present invention, there is provided a magnetic recording and reproducing apparatus which comprises a first mechanism having only a function of reproducing, a second mechanism having two functions of recording and reproducing, a pair of detect switches each for detecting the presence of a tape cassette mounted on the respective mechanism, a selection switch for selecting automatically either one of operations of recording or reproducing when electrical power is provided to the mechanisms, and a control means for operating in reproducing the second mechanism upon providing electrical power thereto in the case of selecting the operation of reproducing by the selection switch and of mounting tape cassettes on both the mechanisms or of mounting a tape cassette only on the second mechanism, and for operating in reproducing the first mechanism in the case of mounting a tape cassette only on the first mechanism. With this arrangement, when both of the mechanisms have tape cassettes mounted thereon, the mechanism having two functions of recording and reproducing is rendered to operate, while, when only the one mechanism having a function of reproducing is provided with a tape cassette, the one mechanism is rendered to operate without trouble.

BRIEF DESCRIPTION OF THE DRAWINGS

These and other objects and feature of the present invention will become apparent from the following description taken in conjunction with the preferred embodiment thereof with reference to the accompanying drawings, in which;

FIG. 3, consisting of FIGS. 3(a) and 3(b), and FIG. 4 are flowcharts showing a process order of operation with respect to the apparatus of FIG. 1.

DETAILED DESCRIPTION OF THE INVENTION

Before the description of the present invention proceeds, it is to be noted that like parts are designated by like reference numerals throughout the accompanying drawings.

Figure 1:
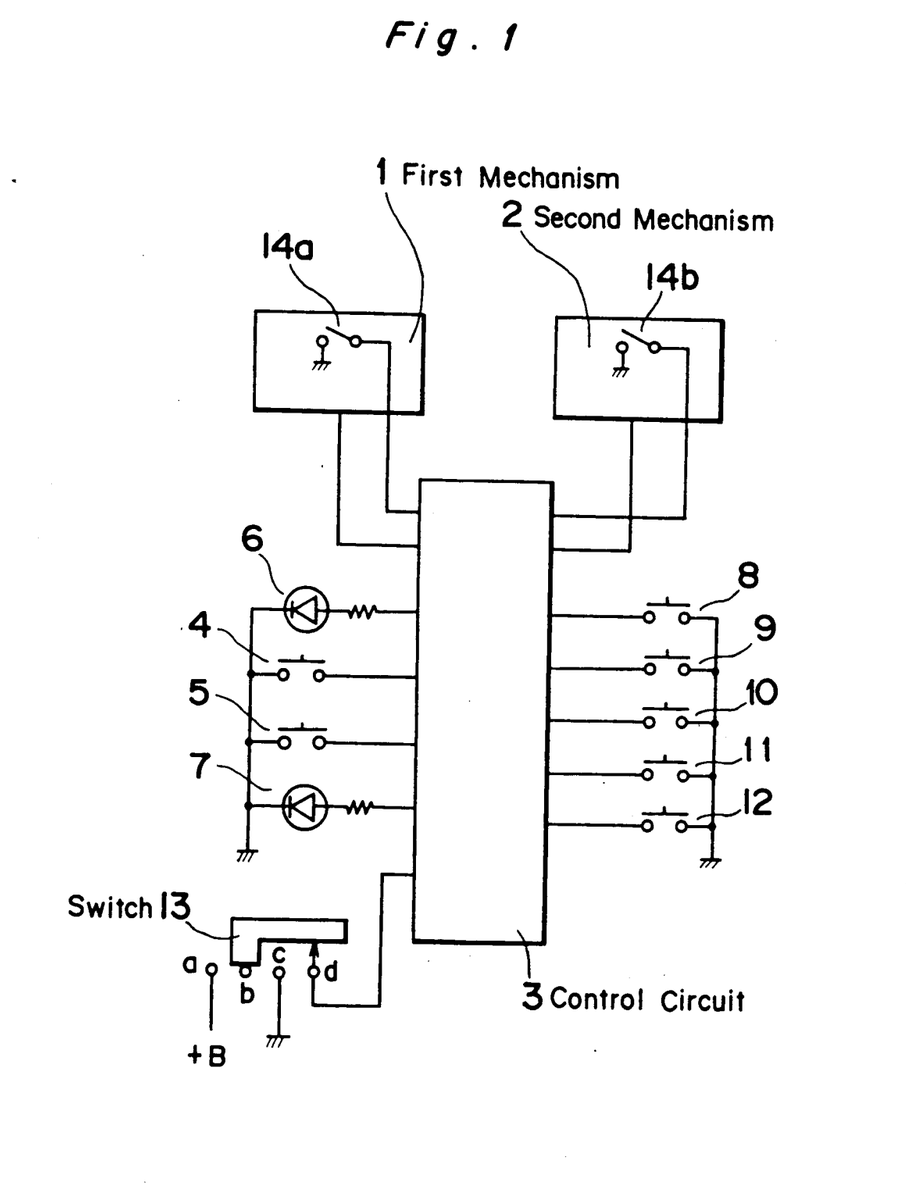
FIG. 1 is a block diagram showing a magnetic recording and reproducing apparatus according to one preferred embodiment of the present invention.

Referring now to the drawings, there is shown in FIG. 1 a magnetic tape recording and reproducing apparatus according to one preferred embodiment of the present invention, which generally includes a first mechanism 1 having a reproducing function, a second mechanism 2 having two functions of recording and reproducing, a control circuit 3 including a micro-computer, a gate circuit and other elements for controlling the operation of each of the mechanisms, a first selection switch 4 for the selection of the first mechanism 1, a second selection switch 5 for the selection of the second mechanism 2, a first display means 6 for indicating the selection of the first mechanism selected by the first selection switch 4, a second display means 7 for indicating the selection of the first mechanism selected by the second selection switch 5, a set of operation switches 8 to 12 for the operations of reproducing, fast forwarding, recording and stopping, and a set switch 13 for setting the starting of a timer.

The set switch 13 includes a common terminal d connected to an input terminal of three values provided in the control circuit 3, a second terminal a connected to an electrical power source of +B to set the recording of timer, a third terminal c connected to ground to set the reproducing of timer, and a fourth terminal b left open without a connection to set into the state of timer being not started, so that the set timer is rendered as a switch for selecting the operation of recording or reproducing to start automatically the recording or reproducing of each of the mechanisms when electrical power is supplied thereto at the time being set by the set timer 13.

Figure 2:
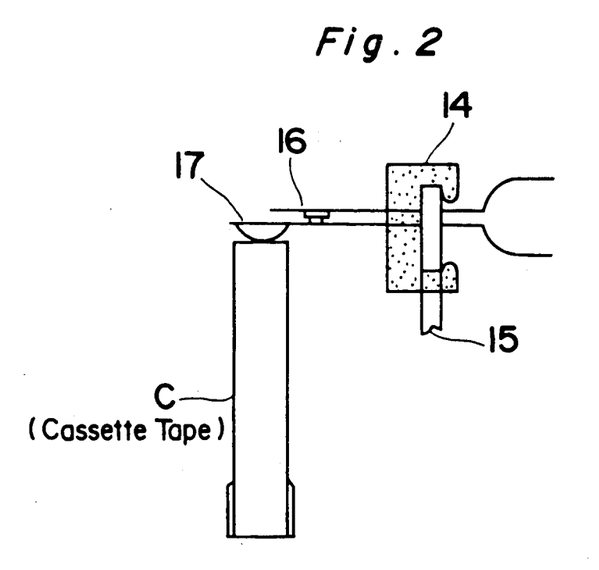
FIG. 2 is an explanatory view of construction showing a portion of a cassette detect switch provided on each of a first mechanism and a second mechanism.

In FIG. 2 showing a side elevational view of a portion of each of the mechanisms 1 and 2, a tape cassette C and a detect switch 14 are fixedly mounted on each of the mechanisms through a printed circuit board 15. The detect switch 14 includes a stationary contact member 16 and a movable contact member 17 which are going to contact with each other when the tape cassette C is mounted on each of the mechanisms 1 or 2, while the contact members 16 and 17 are open when there is no tape cassette in the mechanisms 1 and 2. In FIG. 1, there show a pair of detect switches 14, one switch 14a for the first mechanism 1 and another switch 14b for the second mechanism 2.

Figures 3, 3A:
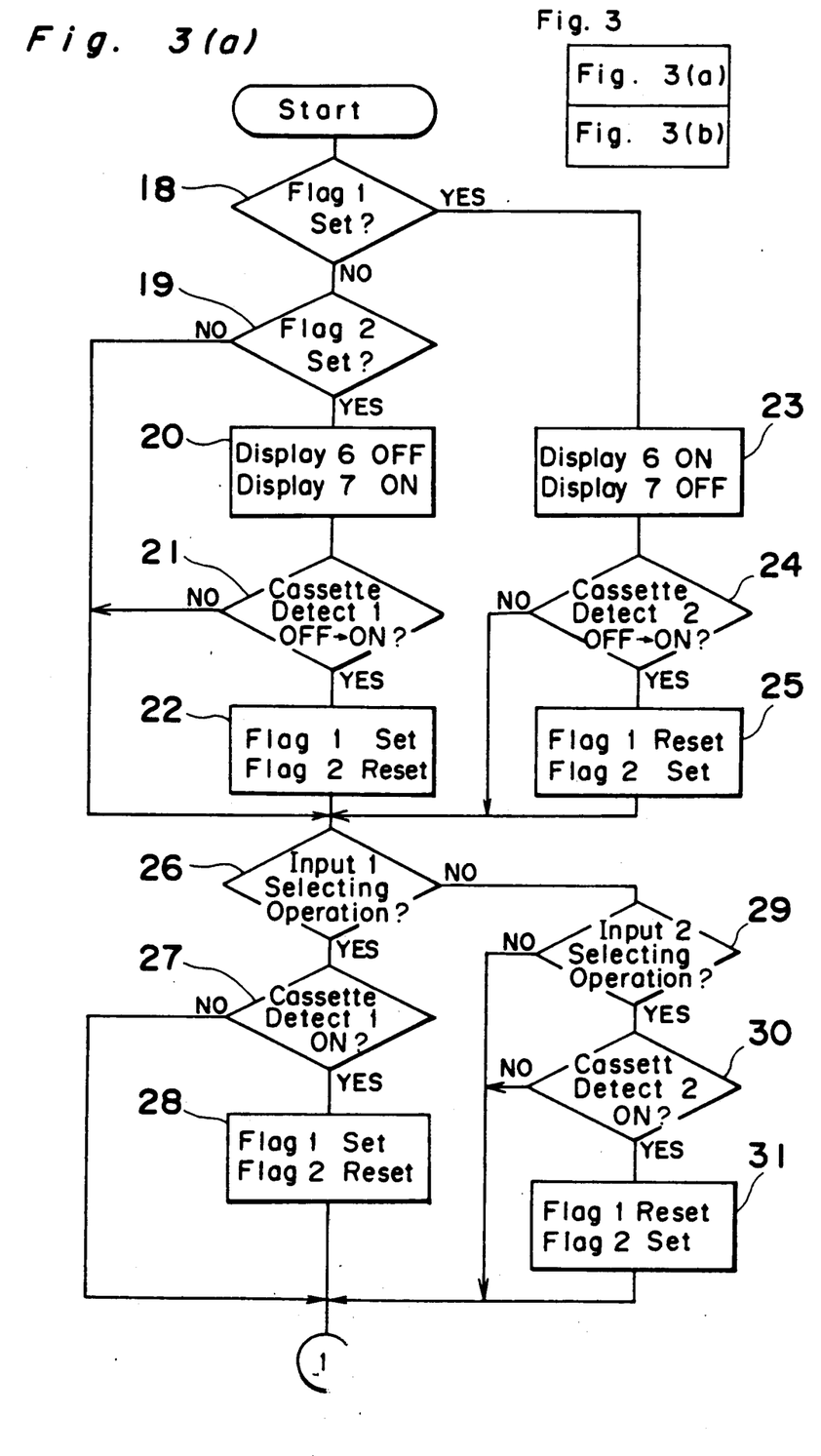
Figure 3B:
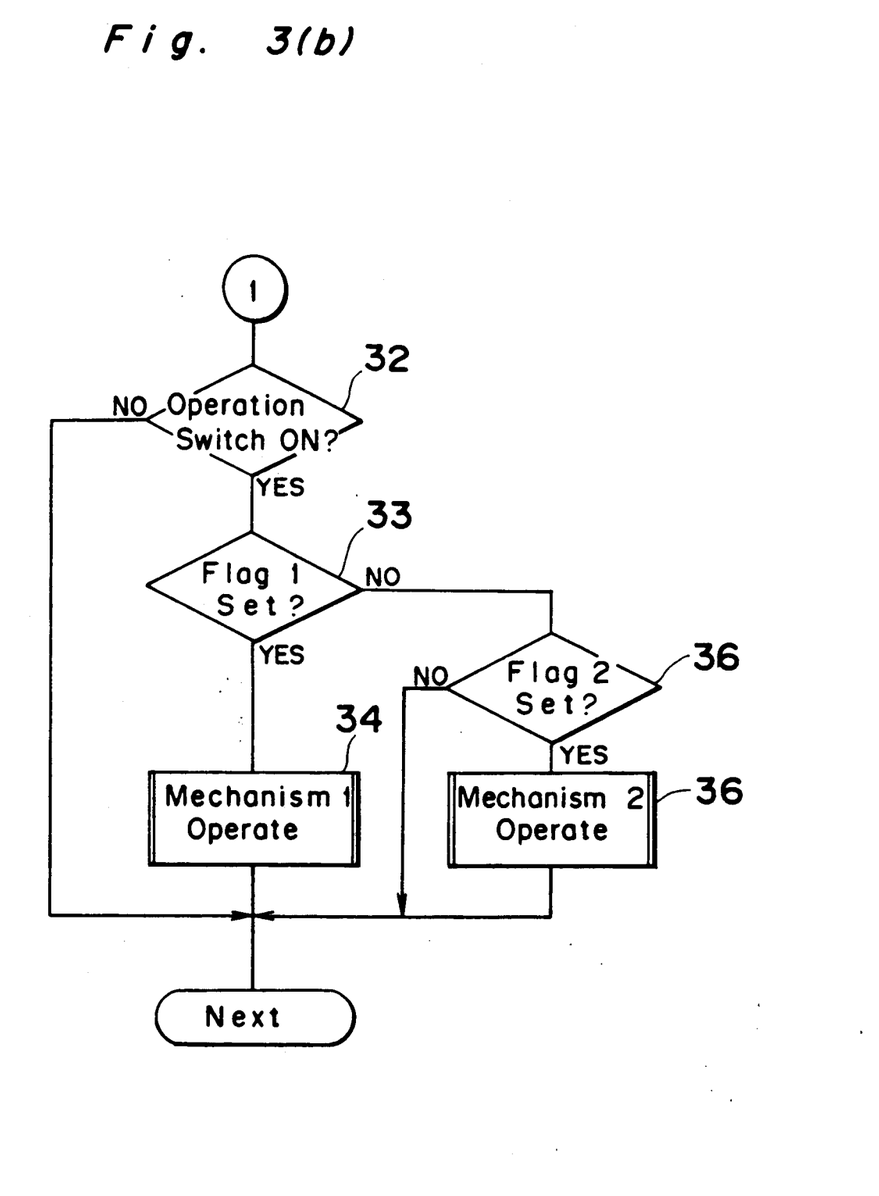
Figure 4:
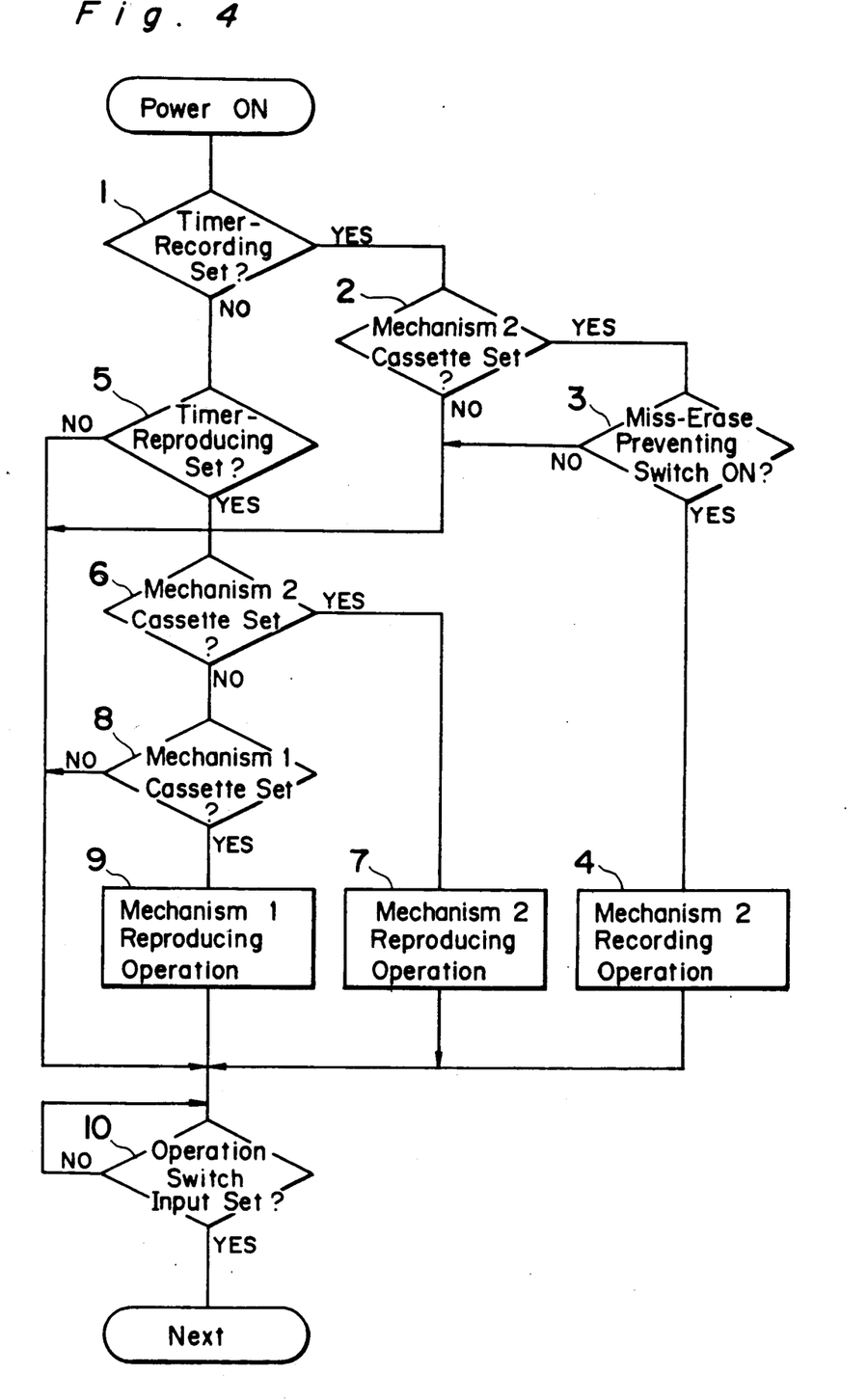

It is noted that the controlling of mechanisms 1, 2 presents a pair of functions according to the present invention, as shown in FIGS. 3 and 4. One of the functions for controlling the mechanisms is shown by the flowchart of FIGS. 3(a) and 3(b). In FIG. 3, if and when a tape cassette C is mounted only on the first mechanism 1 to be operated after electrical power is loaded, as a pair of flags 1 and 2 are turned to reset together at the time of providing the electrical power, the operation proceeds to the step 26 by means of the NO of the step 18 and NO of the step 19. Upon the operation of the selection switch 4 for the first mechanism 1, the operation proceeds to the step 27 by means of YES of the step 26, and, since the detect switch 14a for the first tape cassette is ON, at the step 28 the flag 1 is turned to set and the flag 2 is reset.

With the above state, if none of the operation switches 8 to 12 are operated, the operation proceeds for one cycle of the program by means of the step 32 being NO as shown in FIG. 3(b), and the process thereof is started again in succession from the step 18. At this stage, since the flag 1 is reset, the operation proceeds to the step 23 by means of the step 18 being a YES to turn on the display means 6, showing that the operation of the first mechanism is selected. With this state, the program proceeds again to the step 26 by means of the step 24 being a NO, and is adapted to proceed to the step 32 by means of the step 29 being a NO to check positions of the operation switches 8 to 12 as long as the selection switch 5 for the second mechanism 2 is not operated, for instance, even if the step 26 is in the YES state, regardless of the operation of the selection switch 4 for the first mechanism, for instance, even if the step 26 is in the NO state.

When any of the operation switches 8 to 12 is operated, since the flag 1 is in the state of being set at the step 33, the first mechanism 1 is actuated optionally in controlling of the operations corresponding to the operation switches 8 to 12 by means of the sub-routine of the step 34. After changing the operations to recording, fast forwarding, etc., the program goes around, and it is started again to check from the step 18. Here, if a tape cassette is newly mounted on the second mechanism, the detect switch 14b for the second mechanism 2 is changed from OFF to ON, and, when the operation proceeds from the step 18 to steps 23 and 24, it proceeds to the step 25 by means of the step 24 being a YES to render the flag 1 being reset and the flag 2 being set.

With the above state, if the selection switches 4 and 5 for the mechanisms 1 and 2 are not operated, the operation proceeds from the steps 26 and 29 to the step 32 to go around the program by means of the step 32 being a NO, and, then, the operation proceeds to the step 20 by means of the step 18 being a NO and the step 19 being YES to turn off the display means 6 and to turn on the display means 7 to indicate the fact that the second mechanism 2 has been selected. If and when the selection switches 4 and 5 for the mechanisms 1 and 2 are not operated, the operation proceeds to the step 32, and, when any of the operation switches 8 to 12 are operated, the operation proceeds to the step 36 by means of the step 33 being a NO and the step 36 being a YES to actuate the second mechanism 2 to its desired operation.

With the above operations in series, the second mechanism 2 is operated, which is shifted from that of the first mechanism 1, then, if the first mechanism 1 is stopped or if different operations of the first mechanism 1 occur, by the operation of the selection switch 4 for the first mechanism 1, the operation proceeds to the step 28 from the step 26 being a YES through the step 27 being a YES to set the flag 1, and thereafter, upon the actuation of operation switches 8 to 12 the operation of the first mechanism 1 can be changed.

Another functions of the controlling mechanisms are shown by the flowchart of FIG. 4. In FIG. 4, a determination is made as to whether or not the set switch 13 of FIG. 1 is set to the timer recording mode at the step 1 after electrical power is provided at the time of timer setting, and, if the answer is YES, the presence of a tape cassette C mounted on the mechanism 2 by means of opening or closing the detect switch 14b for the mechanism 2 is determined at the step 2 and the existence of a miss-erase detect being ON is detected at the step 3 if the determination of the step 2 is YES. This means that in a compact tape cassette the presence of a record prevention tab nail is detected in the same manner as that of the detect switch 14 shown in FIG. 2, and, since the detect switch is closed on the employment of a tape cassette capable of recording, the operation proceeds to the step 4 by means of the step determination being a YES to automatically operate the second mechanism in recording.

On the other hand, when the operation of timer reproducing is set by the set switch 13, the operation proceeds to the step 6 from the step 1 being a NO through the step 5 a being YES, and at the step 6 the presence of a tape cassette within the second mechanism 2 is determined in the same manner as that of the step 2 as mentioned above. If the step 6 determination is a YES, the second mechanism 2 is automatically operated reproducing at the step 7. If there is no tape cassette within the second mechanism 2, the operation proceeds to the step 8 from the step 6, but if the tape cassette C is mounted on only the first mechanism 1, the operation proceeds to the next step 9 from the step 8 to automatically operate the first mechanism in reproducing. With the above process, after the set timer 13 is started at the steps 4, 7 and 9, or if the set timer 13 is not started to proceed directly to the step 10 from the step 5, the system the state of waiting for receiving an input from the operation switches 4, 5, 8 to 12 of FIG. 1 at the step 10.

Although in the above explanation of the embodiment as shown in FIGS. 1 to 4 the function shown in the flowchart of FIG. 4 is directed to the apparatus having, for instance, only one set of operation switches 8 to 12 as shown in FIG. 1, it is clearly understood that the same function will be easily obtained by an apparatus having a pair of operation switches each provided within each of the mechanisms. Also, many control functions may be provided for the apparatus by an arrangement of combination between the mechanisms control function as shown by the flowchart of FIGS. 3(a) and 3(b) and the mechanisms control function as shown by the flowchart of FIG. 4.

In addition, the second mechanism 2 shown in the flowchart of FIGS. 3(a) and 3(b) is not provided with both functions of recording and reproducing as a function of mechanism control, but may be provided with only one function of reproducing. Furthermore, it is enough for the apparatus of the present invention to provide at least one function or functions as shown in FIGS. 3(a) and 3(b) and FIG. 4, and it may be applied to the other apparatus having a different function. For instance, although the operations of the first and second mechanisms 1 and 2 are explained in a selection manner in the flowchart of FIGS. 3(a) and 3(b), it may be easily considered to provide an arrangement such that during the reproducing of one mechanism onto which a tape cassette is mounted subsequent to the mounting of a cassette on the other mechanism, the tape cassette mounted on the other mechanism may perform fast forwarding or rewinding so as to stop at the end of the tape.

As is clear from the foregoing description, the magnetic recording and reproducing apparatus according to the present invention is constituted by two sets of mechanisms which are actuated by one set of operation switches to be optionally operated in such a manner that the selection of either mechanism is automatically changed so as to give priority to the operation of one mechanism onto which a tape cassette is mounted subsequent to a cassette being mounted on the other mechanism, on the employment of information derived from detection switches provided in the mechanisms, so as to thereby improve the operation of the apparatus to a great extent. Also, the apparatus of the present invention is able to operate in a manner of timer reproducing for either mechanism selected from the two mechanisms, but also, to increase the number of functions to be operated in the mechanisms by means of program design of the control circuit for the mechanisms, so as to thereby be able to apply the present invention to the various kinds of apparatus in the industry.

Although the present invention has been fully described by way of example with reference to the accompanying drawings, it is to be noted that various changes and modifications will be apparent to those skilled in art. Therefore, unless otherwise such changes and modifications depart from the scope of the present invention, they should be construed as being included therein.

What is claimed is:

1. A magnetic recording and reproducing apparatus comprising:
   a first mechanism and a second mechanism;
   a first cassette detect switch and a second cassette detect switch for respectively detecting the presence of tape cassettes mounted on respective first and second mechanisms;
   a selection switch for selecting either said first or second mechanisms;
   a display means for indicating the mechanism selected by said selection switch;
   a set of operation switches for enabling reproducing, fast forwarding, recording and stopping, and
   a control means operatively connected to all of said switches for automatically switching to give priority to said mechanism upon which a tape cassette has been mounted subsequent to a tape cassette having been mounted on said other mechanism when mounting a tape cassette on one mechanism during stopping or operating of said other mechanism, wherein the operation of said operation switches after either of said mechanisms is selected by said selection switch results in a desired operation of said selected mechanism.

2. A magnetic recording and reproducing apparatus comprising:
   a first mechanism having a reproducing function and a second mechanism having a recording function and a reproducing function;
   a first detect switch and a second detect switch for respectively detecting the presence of tape cassettes mounted on respective first and second mechanisms;

a selection switch for automatically starting the recording or reproducing operation of a mechanism when electrical power is supplied to the mechanism, and a control means operatively connected to all of said switches for automatically operating, upon the selection of a reproducing operation by the selection switch, either said first mechanism in reproducing when a tape cassette is only mounted on said first mechanism, or said second mechanism in reproducing during the supplying of electrical power thereto when tape cassettes are mounted on both said first and second mechanisms or when a tape cassette is mounted only on said second mechanism.

* * * * *